Dec. 30, 1969  C. J. SLAGA  3,486,629
ROTATING ARTICLE DISPLAY MOUNT
Filed Dec. 8, 1967
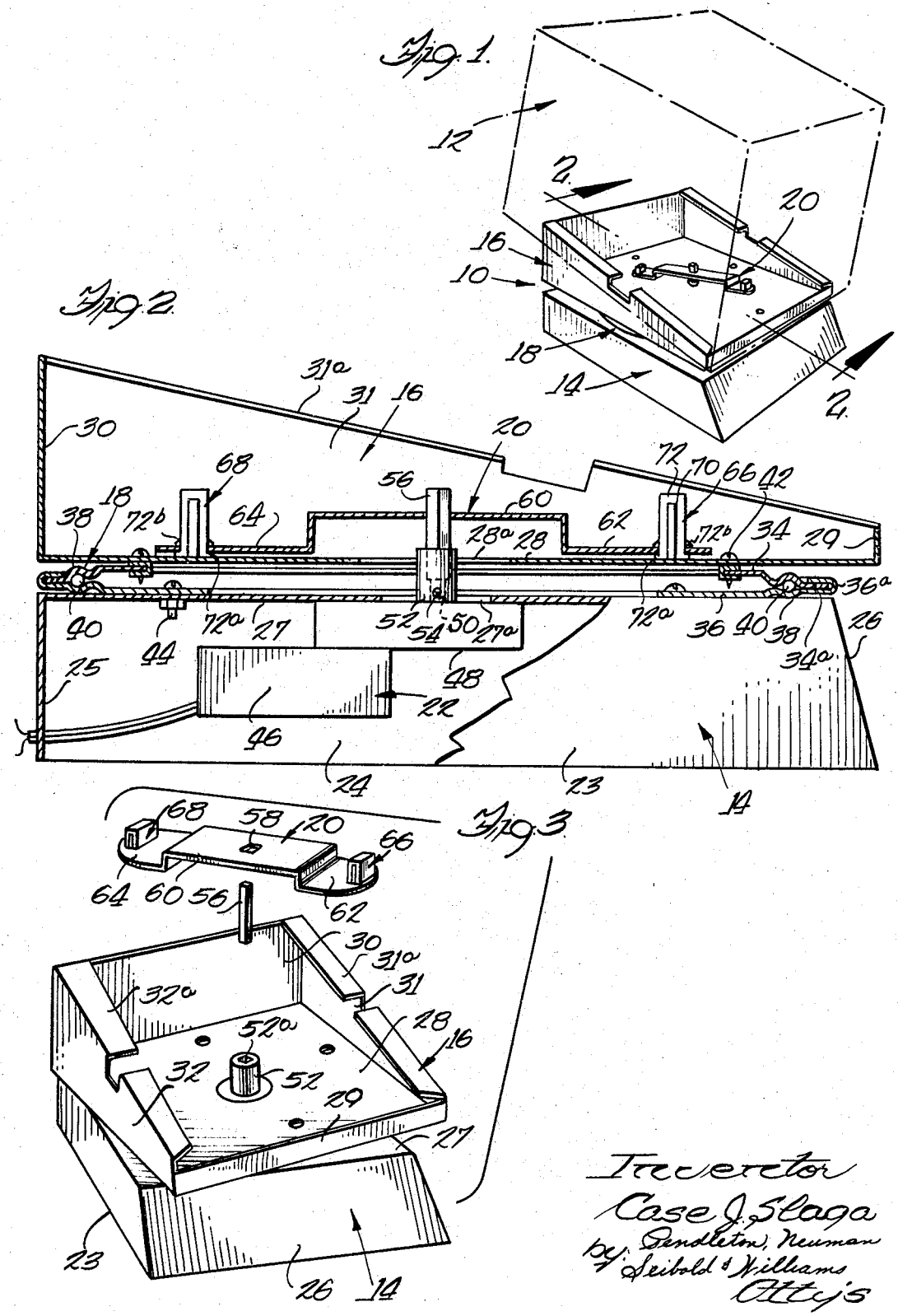

3,486,629
ROTATING ARTICLE DISPLAY MOUNT
Case J. Slaga, Hinsdale, Ill., assignor to Advertising Metal
Display Co., Chicago, Ill., a corporation of Illinois
Filed Dec. 8, 1967, Ser. No. 689,117
Int. Cl. A47f 3/08; A47j 5/025
U.S. Cl. 211—1.5      3 Claims

ABSTRACT OF THE DISCLOSURE

A rotating article-display mount having a base, an article-supporting member mounted on the base for rotation relative thereto, a driven member and drive means for effecting rotation of the driven member relative to the base. The driven member is urged into light frictional engagement with the magnetically attractable surface of the article-supporting member by means of a pair of permanent magnets carried by the driven member. The magnetic connection is such that rotation of the driven member will tend to effect corresponding rotation of the article-supporting member, but the driven member may be rotated relative to the supporting member by said drive means upon the application of a holding or reversing force to the supporting member.

Background of the invention

This invention relates to a rotating article-display mount of the type which is driven by a motor but which allows the article and the article-supporting portion of the mount to be manually rotated or stopped independently of the operation of the motor. Because purchasers tend to manually manipulate displays, a rotating display mount which is to be placed in a location of access by purchasers should be specially designed so that the manual manipulation of the article and of the display mount does not damage the driving mechanism of the mount. One rotating article-display mount structure which accomplishes this result is disclosed in applicant's copending United States patent application Ser. No. 582,992 filed Sept. 29, 1966, now Patent No. 3,396,932. The invention described herein accomplishes this result in a different manner and with a fewer number of parts. Employing a novel drive connection between the driving motor and the article-supporting member, the display mount herein described allows the article and the article-supporting member to be manually stopped, reversed or rotated at a faster speed without damage to the driving mechanism and without altering either the direction or speed of the motor. The article-supporting member may be completely disconnected from the motor drive, thereby permitting the article to be freely rotated with minimum friction.

General statement of the invention

The rotating article-display mount constructed in accordance with this invention is adapted to hold and effect rotation of an article, particularly a large massive article such as an air-conditioning unit. In accordance with one embodiment of the invention, the display mount comprises a fixed base, an article-engaging and supporting member mounted for rotation relative to the base, a driven member, means for urging the driven member into light frictional engagement with the article-supporting member, and drive means for effecting rotation of the driven member relative to the base. It is preferred that there be an annular ball bearing connection between the base and the article-supporting member so that the article-supporting member may be freely rotated relative to the base.

The drive means preferably includes an electric motor mounted in the base and having a vertically extending rotary output shaft, the upper end of which may be easily disconnected from the lower end thereof. The driven member is removably mounted on the upper end of the output shaft. The means urging the driven member into light frictional engagement with the article-supporting member is preferably a pair of permanent magnets which are affixed to the driven member and magnetically connect the driven member to the article-supporting member. The connection is such that the rotation of the driven member by the drive means will tend to effect corresponding rotation of the article-supporting member, but the article-supporting member may be manually stopped, reversed, or rotated at a faster speed without interrupting or changing the direction or speed of rotation of the driven member by the drive means.

Brief description of the drawings

FIG. 1 is a perspective view of the article-display mount schematically showing the way in which a relatively heavy article such as an air-conditioner would be mounted thereon for rotation;

FIG. 2 is an enlarged sectional elevational view of the rotating article-display mount of FIG. 1 taken substantially along line 2—2 of FIG. 1; and FIG. 3 is a partially exploded perspective view of the article-display mount showing the manner in which the rotary output shaft of the drive means is connected to the driven member.

Description of the preferred embodiment

With further reference to the drawings, the rotating article-display mount 10 constructed in accordance with this invention is adapted to support and effect rotation of an article 12, particularly a massive article such as an air-conditioner as schematically illustrated in FIG. 1. The display mount 10 includes a fixed base 14, an article-supporting member 16 adapted to be rotated relative to the base, a rotatable bearing means 18 disposed between and interconnecting the base 14 and the article-supporting member 16, a driven member 20, and drive means 22 for effecting rotation of the driven member 20 relative to the base 14.

The base 14 in the illustrated embodiment is a hollow boxlike member having four upstanding side panels 23, 24, 25 and 26 and a top panel 27. The base is preferably adapted to rest on a horizontal surface such as a store counter top with the top panel 27 thereof disposed in a horizontal position. The top panel 27 has a central aperture 27a.

The article-supporting member 16, preferably constructed of sheet steel, includes a bottom panel 28 having a central aperture 28a in substantial alignment with the central aperture 27a in the top panel 27 of the base. The construction of the article-supporting member 16 will depend upon the nature of the article being supported thereon. In the illustrated embodiment, the article-supporting member includes front and rear upstanding side panels 29 and 30 respectively and a pair of upstanding forwardly tapered side panels 31 and 32 having top flanges 31a and 32a respectively.

The rotatable bearing means 18 is an annular disc-like member or annulus having an annular top section 34 and an annular bottom section 36 forming a raceway 38 of substantially circular cross section with ball bearings 40 disposed therein. The outer peripheral portion 36a of the lower section 36 of the rotatable bearing means is formed around and over the peripheral portion 34a of the upper portion 34 with sufficient clearance between these peripheral portions 34a and 36a to permit free relative rotation of the two sections 34 and 36 on the ball bearings 40 therebetween.

The upper section of the rotatable bearing means is connected by suitable fastener means such as screws 42 to the bottom panel 28 of the article-supporting member 16, and the lower section 36 of the rotatable bearing means is connected also by suitable fastener means such as bolts 44 to the top panel 27 of the base 14. Thus, the article-supporting member 16 with the top section of the bearing means attached thereto may be freely rotated relative to the base 14 and the lower section 36 which is attached thereto. As may be seen, the bearing means 18 is mounted remote from and concentric with the axis of rotation of the article-supporting member.

Mounted within the base 14 is the drive means 22 which preferably includes an electric motor 46 operating through a gear reducer 48 to drive a rotary output shaft 50. On shaft 50 is mounted a connector 52 having a set screw 54 for locking the connector onto the output shaft. The outer end of the connector 52 has a square broached hole 52a best illustrated in FIG. 3, and a rod 56 having a square cross section is adapted to be slip-fitted into the aperture 52a of the connector. When in place in the aperture 52a of the connector, the rod 56 forms an axial extension of the output shaft 50. The output shaft assembly consisting of the output shaft 50, the connector 52 and the rod 56 extends upwardly through the aperture 27a in the top panel 27 of the base and through the aperture 28a in the bottom panel 28 of the article-supporting member.

The driven member 20, as best illustrated in FIG. 3, has a substantially square aperture 58 broached in its central portion 60, this aperture being adapted to accommodate and key with the square rod 56 of the output shaft assembly. Extending radially in opposite directions from the apertured central portion 60 are arms 62 and 64 which carry magnetic elements 66 and 68 respectively. The magnetic elements 66 and 68 are identically constructed, each having a permanent magnet 70 shiftably supported within a nonmagnetic housing 72. The magnetic element housings are mounted in apertures in the respective arms 62 and 64 and are held in place by means of opposed end flanges 72a at the bottom thereof and opposed locking tabs 72b which are spaced above the end flanges 72a and lock against the top surface of the driven member arms 62 and 64. The magnetic elements 66 and 68 may be constructed in accordance with United States Patent No. 2,909,384.

The magnetic elements 66 and 68 are adapted to magnetically attach themselves to the magnetically attractable (sheet steel) bottom panel 28 of the article-supporting member 16, and when the driven member 20 is rotated the article-supporting member 16 will tend to rotate with it. If, however, the article-supporting member is stopped in its rotation, the connection of the magnetic elements 66 and 68 to the bottom panel 28 is such that the magnets will slide over the surface of the bottom panel 28 transverse to the direction of the lines of flux of the magnets. Thus, the magnets keep the driven element in frictional engagement with the bottom panel 28 of the article-supporting member and cause the article-supporting member to rotate unless a sufficient force is applied to that member to overcome the force of friction between the magnetic elements 66 and 68 and the bottom panel 28 of the article-supporting member.

The rotating article-display mount 10 may be employed entirely as a manually rotatable display by merely omitting either or both the drive rod 56 and the driven member 20, for without these, the article-supporting member 16 will not be connected to the drive means 22. In order to connect the article-supporting member 16 to the drive means 22, the drive rod 56 is inserted into the aperture 52a in the connector 52, and the centrally apertured driven member 20 is slid onto the drive rod and lowered until the magnetic elements 66 and 68 contact and magnetically attach to the bottom panel 28 of the article-supporting member. The drive rod 56 is sufficiently long to enable the driven member 20 to be placed thereon before the magnets approach and are affected by the bottom panel 28 of the driven member. The central portion 60 of the driven member 20 is preferably raised with respect to the arm portions 62 and 64, thereby permitting the driven member 20 to be manually manipulated more easily.

The magnetic elements 66 and 68 will hold the driven member 20 in frictional engagement with the surface of the bottom panel 28 causing the article-supporting member 16 to rotate with the drive rod 56 unless a resistance is met, whereby the magnetic elements 66 and 68 will slide over the surface of the bottom panel 28, and the driven member 20 will continue to rotate with the shaft 56 regardless of the movement of the article-supporting member 16.

The strength of the magnets 70 in the magnetic elements 66 and 68, the distance of these magnets from the axis of the drive rod 56, and the strength of the drive means 22 will be interdependent. The strength of the two magnets 70 will determine the amount of frictional force between the driven member 20 and the article-supporting member 16, and the amount of force necessary to rotate the driven member relative to the article-supporting member 16 with the magnets in engagement with the bottom panel 28 will depend upon the frictional moment arm, i.e., the distance of the magnets from the axis of the drive rod 56. The drive means 22 must always be of sufficient capacity to effect rotation of the driven member 20 with respect to the article-supporting means when the magnets are in contact with the article-supporting means. If the drive means 22 is not strong enough to effect rotation of the driven member with respect to the article-supporting means, a reduction in the size of the driven member 20 and/or a reduction in the strength of the magnets 70 will be required.

If it is desired to merely temporarily disconnect the driven member 20 from the drive means 22, this may be effected by merely withdrawing the drive rod 56 from the connector 52 and the aperture 58 of the driven member. Upon replacement of the drive rod 56, the driven member 20 will again be connected to and be rotated with the connector 52 of the drive means 22.

The article-display mount constructed in accordance with this invention permits manual manipulation of the article being rotated without damage to the driving means, and the connection is accomplished in a novel, efficient and inexpensive manner. The connection is such that it may be removed so that the mount may be used solely as a manually rotatable mount, and when desired, it may be quickly and easily changed back to a motor driven mount.

Although the invention has been described with a certain degree of particularity, it is understood that the present disclosure has been made only by way of example and that many modifications and changes in various details may be resorted to without departing from the spirit and scope of the invention as hereinafter claimed.

What is claimed is:

1. A rotating article-display mount comprising a hollow base having an apertured top panel, an article support having a bottom panel and at least two upstanding article-engaging elements, annular rotatable bearing means disposed intermediate the top panel of said base and the bottom panel of said article support whereby said support may be rotated relative to said base, a driven member having a central portion and a pair of arm portions connected thereto and extending radially therefrom, each of said arm portions carrying a permanent magnet for engagement with a surface portion of said article support, power motive means having a rotary output shaft, and means providing a sliding interconnection between said output shaft and said driven member central portion.

2. The structure of claim 1 wherein said means interconnecting said output shaft and said driven member includes a connecting element affixed to said shaft having an aperture aligned with said shaft, an elongated bar, one end of which is removably disposed within the aperture of and keyed for concomitant rotation with said connecting element, the other end of said rod extending outwardly from said connecting element, and said driven member central portion having an aperture slidably accommodating and keyed to the outwardly extending end of said rod, whereby rotation of said rod will result in concomitant rotation of said driven member.

3. A rotating article display mount comprising a base, an apertured article supporting member mounted for rotation relative to said base, a driven member comprising an elongated element having an apertured central portion and a pair of radially extending arm portions, each arm portion carrying a permanent magnet adjacent its distal end, said magnets urging said driven member into a light frictional engagement with said article supporting member with such force that rotation of said driven member will tend to effect corresponding rotation of said article supporting member but said members may be rotated relative to each other upon application of an external force to said supporting member, and drive means for effecting rotation of said driven member relative to said base, said drive means including a motor adjacent to said base, said motor having a shaft which extends through the aperture in said article supporting member a sufficient distance to permit the apertured central portion of said driven member to be slid thereonto without substantial interference from the magnets acting against said article supporting member.

References Cited

UNITED STATES PATENTS

| | | | |
|---|---|---|---|
| 1,312,632 | 8/1919 | Huerta | 211—1.5 |
| 1,539,626 | 5/1925 | Bartlett | 211—1.5 |
| 1,699,463 | 1/1929 | Cresci | 248—349 |
| 2,147,204 | 2/1939 | Laird. | |
| 2,587,788 | 3/1952 | Tacy | 211—1.5 |
| 2,755,583 | 7/1956 | Loeb | 211—163 |
| 2,898,163 | 8/1959 | McMahan | 248—425 |
| 3,207,316 | 9/1965 | Egger | 211—1.5 |
| 3,240,304 | 3/1966 | Wickersham. | |
| 3,255,890 | 6/1966 | Gerber | 211—1.5 |
| 3,396,932 | 8/1968 | Slagg | 248—349 |

FRANCIS K. ZUGEL, Primary Examiner

U.S. Cl. X.R.

108—20; 248—349, 425